Oct. 2, 1956          J. T. GRIEFF          2,765,093

HYGIENIC MILKING BUCKETS AND LIKE CONTAINERS

Filed Sept. 26, 1951

Johann Theodor Grieff
INVENTOR

BY

Peter J. Gaylor
ATTORNEY

United States Patent Office 2,765,093
Patented Oct. 2, 1956

2,765,093

HYGIENIC MILKING BUCKETS AND LIKE CONTAINERS

Johann Theodor Grieff, Observatory, Cape of Good Hope, Union of South Africa

Application September 26, 1951, Serial No. 248,334

5 Claims. (Cl. 220—1)

The present invention relates to improvements in hygienic milking buckets and like containers.

Many attempts have already been made to devise buckets eliminating the contamination of milk during and after milking, such as is liable to occur both in hand or machine milking, as by straw, fodder, dung, cow's hair, dust, water condensed on the shed roof or other unhygienic material falling into the milk. None of these attempts have been completely successful. Often the bucket was too complicated in construction so that it was difficult to manufacture or difficult to clean. Because of their shape the known buckets were often easily damaged or dented so as rapidly to become unsightly in use. Some buckets were provided with flaps or other closure members which easily got lost or were difficult to clean. Also the handles were usually positioned inconveniently and often unhygienically rendering the buckets difficult to carry.

An object of the invention is the provision of a hygienic milking bucket or like container avoiding or mitigating at least some of the disadvantages above mentioned and in its optimum form all of them.

Other objects of the invention will become apparent from the following specification.

A hygienic milking bucket or like container in accordance with the invention comprises a container of convenient size closed except for an opening not substantially bigger than required for convenient milking or filling and cleaning, the said container being so shaped and/or provided with means enabling it for milking or filling to stand stably with the opening positioned for the ready reception of the milk or other liquid (preferably with the opening in a horizontal or near horizontal position) and otherwise to stand stably with the opening in a vertical or near vertical position or a position that the upper walls of the opening extend almost up to, over or beyond the vertical projection of the lower edge, the opening in both positions being at or near the top of the container.

Thus, except when the bucket or the like is employed for milking or filling e. g. when it is empty or contains milk or other liquid, it can be put down without any particular manipulation in a stable position in which substantially no contaminations can fall into the bucket or the like, because then in the plane view there is no or substantially no opening visible from above.

To enable the bucket to stand stably in both positions specified it may be provided with two suitable base supports, preferably of the tripod type. The tripod points may be provided in the form of protuberances pressed out of the material of the container. In a preferred form of the bucket two tripod points may be common to both bases, by being placed centrally on either side of the bucket, the third tripod point for the bucket in the milking position being positioned centrally and rearward to be on a horizontal plane with the other two points when the opening faces upwards. Advantageously the opening is then above the area covered between the said three tripod points. The latter tripod point is advantageously formed by the lower bend of a handle.

If the bucket be pivoted forward on the two centrally positioned tripod points aforementioned until the opening is brought into a vertical or near vertical position, the bucket comes to rest on a front tripod point. The tripod points or some of them preferably consist of protuberances pressed out of the material. Pressing the protuberances out of the material has the advantage that the buckets are cheap to product. Welding hemi-spherical protuberances on to the outside of the buckets strengthen them for hard wear. Both forms are easy to clean inside and outside as no inaccessible sharp corners are presented. The avoidance of sharp rims, such as usually form the base of normal buckets will be much appreciated by the persons having to work with the buckets. The said tripod supports are particularly advantageous from the hygienic point of view since they present the smallest possible area of contact with the ground, which is so often filthy in the vicinity of cows.

The buckets in accordance with the present invention may present a substantially circular configuration when viewed as a side elevation, except that the upper outline is constituted by a tangent from the upper rim of the opening to the circular outline of the container.

In place of the said circular configuration the bucket may present any other suitable configuration in cross-section e. g. polygonal. Thus a heptagonal, hexagonal or pentagonal form may be suitable, and the opening of the container may be positioned in one of the surface areas of the polygon. That side of the polygon above the opening may be extended so that its end approaches, coincides with or overlaps the vertical projection of the lower edge of the opening, when the bucket or container stands in its non-filling position. The said bucket or container may be adapted to stand on appropriate polygonal sides, but preferably protuberances, as hereinbefore referred to, may be provided at the corners of the polygons or in any other suitable positions.

The sides of the container are preferably flattened.

According to another embodiment, the circumference is, except near the top of the opening and from the lower lip of the opening to the front protuberance, smaller around its middle, i. e. of narrower vertical cross-section, in which way two intermediate protuberances of the tripod support become redundant. In this way a long handle may be contained and part protected in the channel thus formed, as the handle hardly protrudes, thus reducing the over-all height while providing ample room for the hand to grip it. Again the bucket may be broader at the bottom than the top. Also the bucket may be provided with knee rests. A spheroid or near spheroid form of bucket may be employed. Two or more of the aforesaid features may be combined.

The buckets are advantageously manufactured by pressing two symmetric halves from sheet material and welding them together around the circumference of the bucket and welding on the handle. The welding seams may be ground down and polished smooth inside and outside the bucket. This method of manufacture is very economical.

The bucket is preferably provided with a single handle extending along its back and over its top relative to the bucket in its empty or storage position parallel to the shape of the bucket. This has the advantage that in whatever position the bucket is carried a convenient grip is always provided by the handle above the centre of gravity of the bucket, which makes for the greatest ease of carrying in any desired position. Alternatively two or more grips are provided only in those positions where they are necessary.

The handle arranged as aforesaid allows of the cleaned or steam sterilised bucket being hung up in a position, so that it can be drained of water etc. completely.

The opening of the bucket may, if desired, be suitably tapered to facilitate the pouring out of milk.

The nature of the invention and in what manner the same is to be performed will be further described and ascertained by way of example with reference to the accompanying diagrammatic drawings but it should be understood that the invention is not limited to the example given.

In the drawings Figs. 1 and 2 represent a side elevation and a front elevation respectively of a bucket in accordance with the invention in the storage or empty position.

Figure 1:
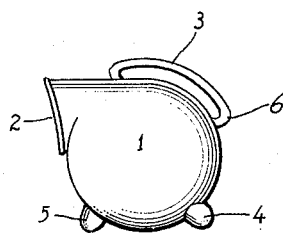
Figure 2:
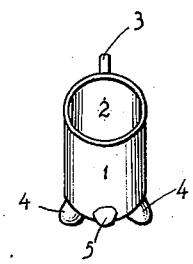
Figure 3:
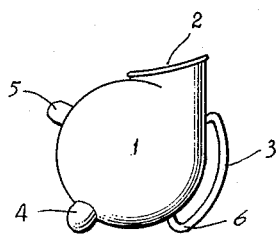
Fig. 3 illustrates a side elevation of the same bucket in the milking or filling position.
Figure 4:
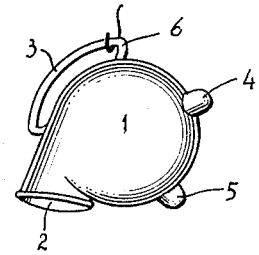
Fig. 4 is a side elevation of the bucket hung up for draining.

Referring to Figs. 1 to 4 of the drawings: 1 is the container with opening 2 and handle 3. It is provided with a pair of protuberances 4 serving as support points common to both sets of tripod supports. 5 is the front protuberance to complete the front set of tripod points whereas point 6 on handle 3 completes the support points of the rear set of tripod points.

While the present invention is primarily concerned with milking buckets it also relates to other containers as, for example, to jugs for use in wine cellars.

What I claim is:

1. A hygienic container for liquid adapted for use as a milking bucket, which comprises a hollow body having mainly a substantially circular perimeter on a vertical plane and flattened side walls opposite each other on either side of the said perimeter, which body has a substantially narrower width along its axis than the diameter of its perimeter and is closed except for an opening allowing of convenient filling, cleaning of the container and milking thereinto, the said hollow body presenting a supporting plane on its said perimeter for standing the body on the ground in a position in which the opening faces upwards and another supporting plane on its said perimeter for standing the body on the ground in a position in which the opening is in a substantially vertical position, the upper edge of the opening when in said last named position extending at least up to the vertical projection of the lower edge of the opening, the opening being in the proximity of the top of the container in both positions.

2. A hygienic container for liquid adapted for use as a milking bucket, which comprises a hollow body having mainly a substantially circular perimeter on a vertical plane and flattened side walls opposite each other on either side of the said perimeter, which body has a substantially narrower width along its axis than the diameter of its perimeter and is closed except for an opening allowing of convenient filling, cleaning of the container and milking thereinto, the said hollow body presenting a supporting plane on its said perimeter for standing the body on the ground in a position in which the opening faces upwards and another supporting plane on its said perimeter for standing the body on the ground in a position in which the opening is in a substantially vertical position, the upper edge of the opening when in said last named position extending at least up to the vertical projection of the lower edge of the opening, the opening being in the proximity of the top of the container in both positions, and the said supporting planes being contained by tripod support points on three of which the container will rest in the desired position without otherwise contacting the supporting base.

3. A hygienic container for liquid adapted for use as a milking bucket as claimed in claim 2, which latter are provided in the form of part spherical protuberances welded on to the outside of the container.

4. A hygienic container for liquid adapted for use as a milking bucket as claimed in claim 2, in which the supporting planes are provided by tripod support points, a pair of which tripod points are common to both supporting planes by being placed centrally, one point on each side of the periphery of the container, the third tripod points of each of the two supporting planes being provided on the periphery of the container on opposite sides of the said pair of points.

5. A hygienic container for liquid adapted for use as a milking bucket as claimed in claim 2, which has a single handle extending along its back and over its top relative to the container in its storage position parallel to the shape of the container, so that in whatever position the container is carried a convenient grip is always provided by the handle above the centre of gravity of the bucket or container.

References Cited in the file of this patent

UNITED STATES PATENTS

| | | |
|---|---|---|
| 362,616 | Freudenberg | May 10, 1887 |
| 419,472 | Plumby | Jan. 14, 1890 |
| 560,916 | McDonough et al | May 26, 1896 |
| 805,312 | Meinecke | Nov. 21, 1905 |
| 867,940 | Bell | Oct. 15, 1907 |
| 930,721 | Beach | Aug. 10, 1909 |
| 959,590 | Perry | May 31, 1910 |
| 2,019,249 | Bradley | Oct. 29, 1935 |
| 2,582,398 | Seigenthal | Jan. 15, 1952 |

FOREIGN PATENTS

| | | |
|---|---|---|
| 860 | Great Britain | 1873 |
| 3,460 | Great Britain | 1892 |
| 20,424 | Great Britain | 1904 |
| 611,020 | France | Sept. 18, 1926 |
| 752,074 | France | July 10, 1933 |